US006931164B2

(12) United States Patent
Risser et al.

(10) Patent No.: US 6,931,164 B2
(45) Date of Patent: Aug. 16, 2005

(54) WAVEGUIDE DEVICES INCORPORATING KERR-BASED AND OTHER SIMILAR OPTICALLY FUNCTIONAL MEDIUMS

(75) Inventors: Steven M. Risser, Reynoldsburg, OH (US); Vincent McGinniss, Sunbury, OH (US); David W. Nippa, Dublin, OH (US); Richard W. Ridgway, Westerville, OH (US); John Snyder, Westerville, OH (US)

(73) Assignee: Optimer Photonics, Inc., Columbus, OH (US)

( * ) Notice: Subject to any disclaimer, the term of this patent is extended or adjusted under 35 U.S.C. 154(b) by 210 days.

(21) Appl. No.: 10/395,835

(22) Filed: Mar. 24, 2003

(65) Prior Publication Data

US 2004/0096137 A1 May 20, 2004

Related U.S. Application Data

(60) Provisional application No. 60/439,253, filed on Jan. 10, 2003, and provisional application No. 60/427,725, filed on Nov. 20, 2002.

(51) Int. Cl.[7] ................................................. G02F 1/35
(52) U.S. Cl. ............................... 385/3; 385/8; 385/122
(58) Field of Search ............................... 385/1, 2, 3, 8, 385/122, 123–132, 141, 144, 14, 145

(56) References Cited

U.S. PATENT DOCUMENTS

| 4,775,215 A | 10/1988 | Teng et al. |
| 4,877,298 A | 10/1989 | Teng et al. |
| 5,007,695 A | 4/1991 | Chang |
| 5,182,783 A | 1/1993 | Bosc et al. |
| 5,206,922 A | 4/1993 | Westland et al. |
| 5,377,284 A | 12/1994 | Biilow |
| 5,533,151 A | 7/1996 | Leonard |
| 5,970,185 A | 10/1999 | Baker et al. |
| 6,236,774 B1 * | 5/2001 | Lackritz et al. ................ 385/14 |
| 6,373,620 B1 * | 4/2002 | Wang .......................... 359/315 |
| 2002/0105713 A1 | 8/2002 | Rice |

OTHER PUBLICATIONS

J.R. Meyer–Arendt, Introduction to Classical and Modern Optics, Prentice Hall, Inc, Fourth Edition, pp 302–303, 1995.*

Ingegerd Aberg, High–frequency switching and Kerr effect–nonlinear problems solved with nonstationary time domain techniques, Department of Electroscience Electromagnetic Theory Lund Institute of Technology Sweden CODEN–LUTEDX(TEAT–7052)(/1–39/(1996)P. 22–35.

Dalton et al., From molecules to opto–chips: organic electro–optic materials, Journal of Materials Feature Article Chemistry, May 26, 1999, p. 1905–1920.

Driessen A. et al: "All–optical integrated optic devices: A hybrid approach" IEE Proceedings: Optoelectronics, Institution of Electrical Engineers, Stevenabe, GB, vol. 145, No. 4., Aug. 18, 1998, pp. 227–235.

* cited by examiner

Primary Examiner—Akm Enayet Ullah
Assistant Examiner—Sarah Song
(74) Attorney, Agent, or Firm—Dinsmore & Shohl LLP

(57) ABSTRACT

A waveguide device is provided comprising an optical waveguide core and a cladding optically coupled to the optical waveguide core. The cladding comprises an optically functional region defining a refractive index that is configured to vary in response to a control signal applied to the optically functional region. The refractive index of the optically functional region is lower than the refractive index of the optical waveguide core. In accordance with one embodiment of the present invention, the optically functional region may be characterized as a Kerr Effect medium.

81 Claims, 5 Drawing Sheets

WAVEGUIDE DEVICES INCORPORATING KERR-BASED AND OTHER SIMILAR OPTICALLY FUNCTIONAL MEDIUMS

CROSS-REFERENCE TO RELATED APPLICATIONS

This application claims the benefit of U.S. Provisional Application Ser. Nos. 60/427,725, filed Nov. 20, 2002 and 60/439,253, filed Jan. 10, 2003. The present application is related to U.S. Patent Application Ser. No. 09/916,238, filed Jul. 26, 2001, now U.S. Pat. No. 6,687,425, Ser. Nos. 10/098,730, now U.S. Pat. No. 6,782,149, and 10/098,731, now U.S. Pat. No. 6,795,597, filed Mar. 15, 2002, and Ser. No. 09/777,439, filed Feb. 6, 2001.

BACKGROUND OF THE INVENTION

The present invention relates to optical signal transmission and, more specifically, to improved waveguide devices useful in applications requiring modulation, attenuation, polarization control, and switching of optical signals.

BRIEF SUMMARY OF THE INVENTION

In accordance with one embodiment of the present invention, a waveguide device is provided comprising an optical waveguide core and a cladding optically coupled to the optical waveguide core. The cladding comprises an optically functional region comprising a Kerr Effect medium and defining a refractive index that is configured to vary in response to a control signal applied to the optically functional region. The refractive index of the optically functional region is lower than the refractive index of the optical waveguide core at the optical wavelength and temperature of operation of the device.

In accordance with another embodiment of the present invention, the control signal is characterized by a control signal magnitude and the optically functional region of the cladding defines a refractive index that approximates a function that varies with a square of the control signal magnitude.

In accordance with yet another embodiment of the present invention, the optically functional region of the cladding comprises a cladding medium configured to induce a phase shift in an optical signal propagating through the optically functional region in response to a control voltage applied to the optically functional region. The cladding medium is configured such that successive $\pi$ phase shifts (180°) are induced in the optical signal as a magnitude of the control voltage is increased in successive increments $V\pi$, The successive increments $V\pi$ decrease in magnitude as the magnitude of the control voltage is increased.

In accordance with yet another embodiment of the present invention, the cladding comprises an optically functional region defined by an un-poled, substantially isotropic or substantially anisotropic, polymeric cladding medium. For the purposes of describing and defining the present invention, it is noted that a poled material or medium refers to a material in which the optical anisotropy has been established prior to application of an applied field or other external control signal. The orientational ordering responsible for this anisotropy does not significantly vary with the application or removal of the external control signal. In contrast, an un-poled material or medium refers to a material in which the optical anisotropy is minimal before the control signal is first applied. The orientational ordering responsible for this anisotropy is strongly influenced by the control signal and the optical anisotropy rapidly decays after removal of the control signal.

In accordance with yet another embodiment of the present invention, the cladding medium comprises a polymer/chromophore blend characterized by a degree of chromophore mobility sufficient to enable the optically functional region to transition passively from a substantially oriented state to a substantially isotropic state in less than about one second. For the purposes of defining and describing the present invention it is noted that respective oriented and isotropic states are referred to as "substantially" oriented or isotropic to account for minor variations in the orientation of the material.

In accordance with yet another embodiment of the present invention, the waveguide device further comprises a controller configured to control an operating temperature of the waveguide device. The polymeric cladding medium is characterized by an effective glass transition temperature that is less than the operating temperature of the device.

Accordingly, it is an object of the present invention to provide for improvements in optical waveguide devices useful in applications requiring modulation and switching of optical signals. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
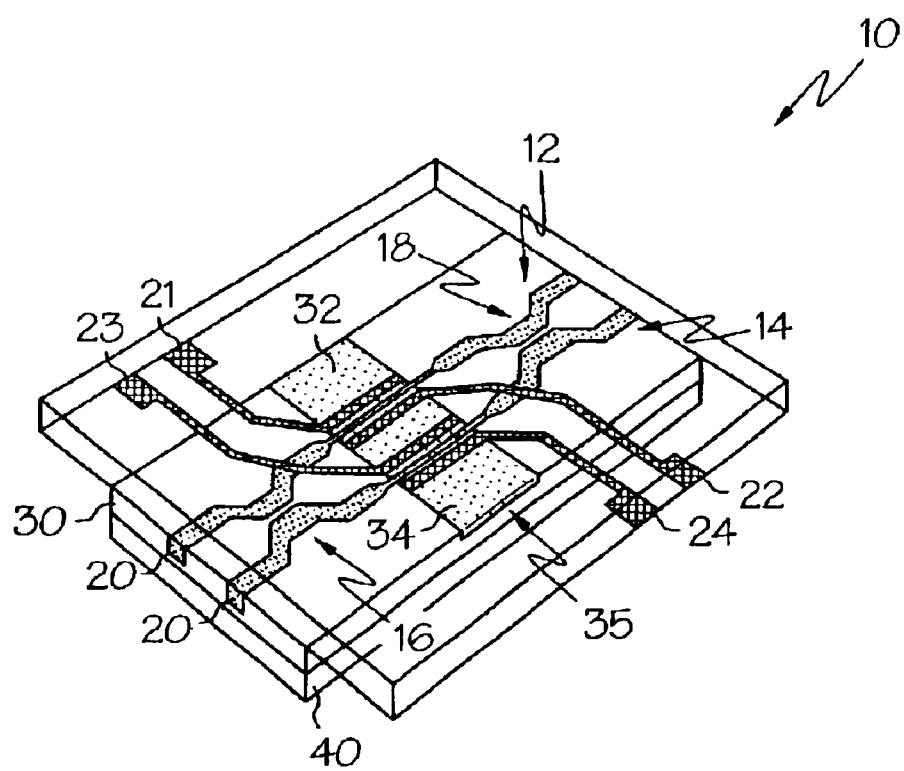
FIG. 1 is a three dimensional illustration of a waveguide device according to one embodiment of the present invention.

Referring initially to FIG. 1, a waveguide device 10 according to the present invention is illustrated in the context of a Mach Zehnder interferometer configuration. Specifically, the waveguide device 10 comprises respective optical waveguide cores 20 and an associated cladding 30 optically coupled to the optical waveguide core 20. A substrate 40 supports the cladding 30 and cores 20. In the illustrated embodiment, first and second optical waveguide arms 12, 14 are arranged to define an optical signal splitting region 16 near an input side of the waveguide device 10 and an optical signal combining region 18 near an output side of the waveguide device 10. Each of the waveguide arms 12, 14 comprises an optical waveguide core 20. The cladding 30 comprises an optically functional region 35 disposed between the optical signal splitting and combining regions 16, 18. The optically functional region 35 comprises a first optically functional portion 32 associated with the first optical waveguide arm 12 and a second optically functional portion 34 associated with the second optical waveguide arm 14.

The optically functional region 35, the characteristics and properties of which are described in further detail below, defines a refractive index that is lower than the refractive index of the optical waveguide core 20. In this manner, a substantial portion of light introduced into the waveguide core 20 along an optical axis of the device a substantial portion of the light introduced into the waveguide core remains confined within the waveguide core and a substantial portion of the light is allowed to propagate in the optically functional region of the cladding. For the purposes of defining and describing the present invention, it is noted that the respective "substantial" portions of light comprises portions significant enough to enable control of an output optical signal of the device through variations in the refractive index of the optically functional region of the cladding. It is also noted that, for the purposes of defining and describing the present invention, reference to the relative values of the refractive indices of the optically functional region and the optical waveguide core are made with the inherent assumption that the relative values are taken at the operational wavelength and temperature of operation of the device, unless otherwise noted.

As is explained in further detail below in the context of suitable device operating temperatures, suitable operating temperatures of optical waveguide devices according to the present invention are a function of the properties of the optically functional region and the optical waveguide core. For example, in embodiments of the present invention where the optically functional region is to define a refractive index that is lower than the refractive index of the optical waveguide core, it will be necessary to ensure that the operating temperature of the device is well above room temperature if, at room temperature, the refractive index of the optically functional region is above that of the core. Indeed, many functional polymers according to the present invention may be characterized as negative ($\Delta n \Delta t$) polymers in that they define refractive indices above those of typical core materials at room temperature but below those core materials at higher temperatures. Of course, it is contemplated that the present invention may utilize positive ($\Delta n \Delta t$) polymers and is not limited to negative ($\Delta n \Delta t$) polymers.

The portion of light allowed to propagate in the optically functional region of the cladding depends upon the degree to which the refractive index of the optically functional region 35 is lower than the refractive index of the optical waveguide core 20. It is contemplated that, in most embodiments of the present invention, at least about 10% and no greater than about 90% of the light introduced into the waveguide core should be confined within the waveguide core. More specifically, it is contemplated that in many embodiments of the present invention between about 30% and about 90% of the light introduced into the waveguide core will remain confined within the waveguide core. With further specificity, the most commonly contemplated embodiments of the present invention will yield between about 40% and about 60% confinement of the propagating light within the waveguide core. In terms of refractive index values, the refractive index of the optically functional region in many embodiments of the present invention, will be between about 0.3% and about 1% lower than the refractive index of the optical waveguide core. For example, the refractive index of the optical waveguide core may be between about 1.450 and about 1.455 while the refractive index of the optically functional region of the cladding may be between about 1.440 and about 1.450. In one specific embodiment of the present invention, the refractive index of the optical waveguide core at 1550 nm is about 1.4542 and the refractive index of the optically functional region of the cladding is about 1.444.

Figure 6:
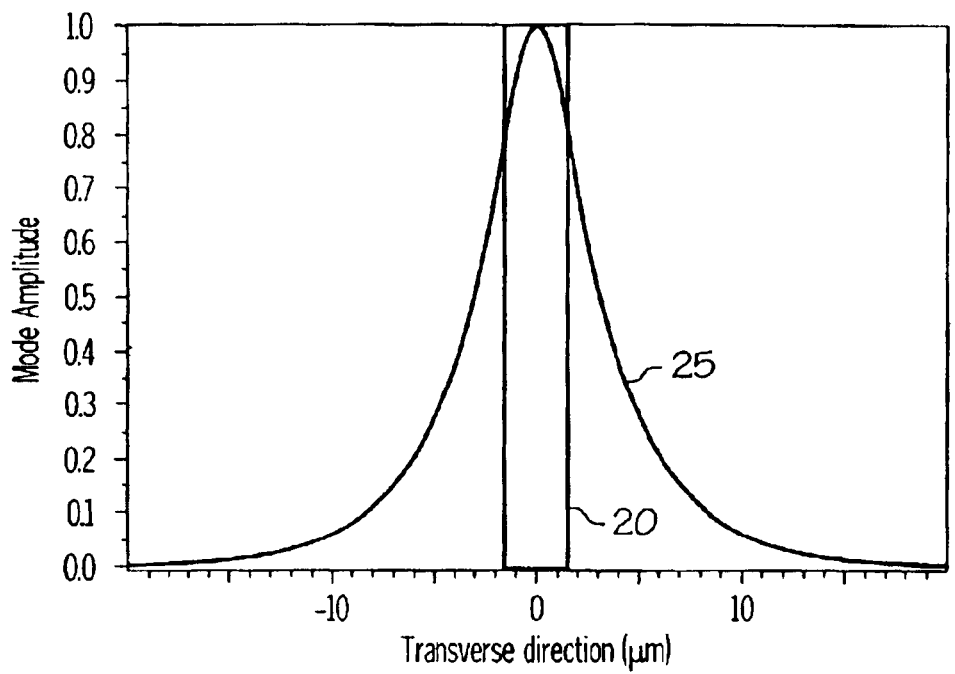
FIGS. 6 and 7 illustrate the intensity distribution of an optical signal, relative to the waveguide core dimensions of a waveguide device according to the present invention.
Figure 7:
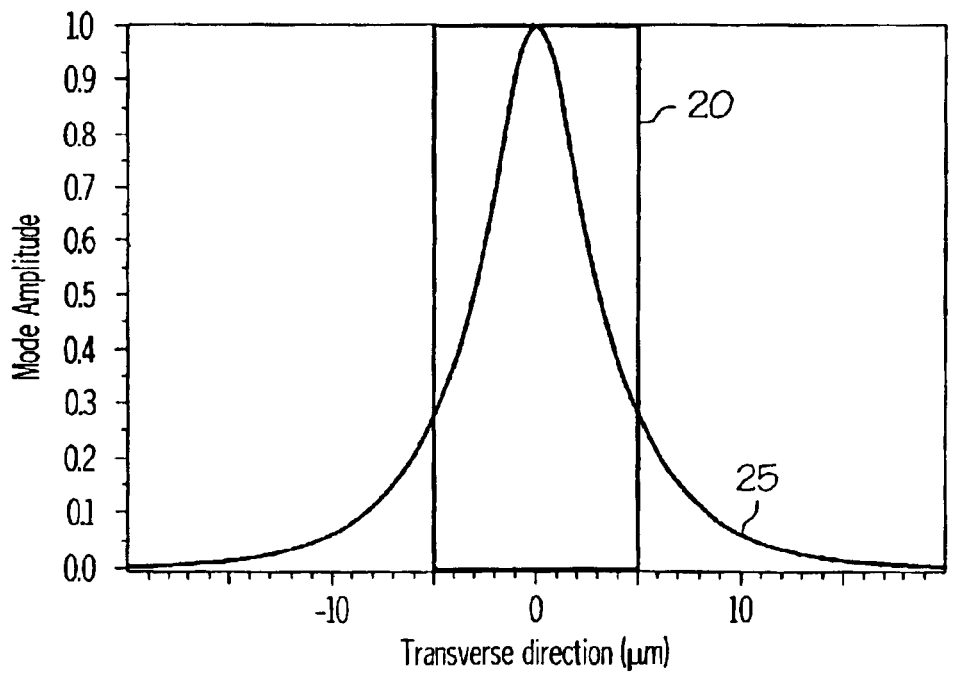

The degree of confinement of propagating light within the waveguide core 20 is also a function of the size of the core 20. Specifically, referring to FIGS. 6 and 7, it is contemplated that optical waveguide cores 20 according to the present invention, illustrated schematically in FIGS. 6 and 7 relative to an intensity profile 25 of a propagating signal, will define cross sectional widths of between about 3 $\mu$m and about 10 $\mu$m. The optical waveguide core typically comprises an optically passive material sharing the same portion of the optical axis as the optically functional region of the waveguide device but may alternatively comprise an optically functional portion (e.g., an electrooptic material, a thermooptic material, etc.).

Depending upon the desired operational characteristics of the particular waveguide device according to the present invention, it is contemplated that it may often be advantageous to ensure that the refractive index of the optically functional region is lower than the refractive index of the optical waveguide core at temperatures above the effective glass transition temperature of the cladding medium. For the purposes of describing and defining the present invention, it is noted that the effective glass transition temperature of a material is the temperature at which the reorientational mobility of the chromophore shows a relatively large increase as a function of the temperature of the material. The effective glass transition temperature of an electrooptic material may be determined from measurements of the electrooptic response of the material as a function of its temperature.

Similarly, it is also contemplated that it may often be advantageous to ensure that the refractive index of the optically functional region of the cladding is lower than the refractive index of the optical waveguide core at wavelengths between about 1200 nm and about 1650 nm or, more specifically, at a wavelength of about 1300 nm or about 1550 nm. For the purposes of defining and describing the present invention, it is noted that reference to the relative values of the refractive indices of the optically functional region and the optical waveguide core are made with the inherent assumption that the relative values are taken at the operational wavelength and temperature of operation of the device, unless otherwise noted.

Figure 2:
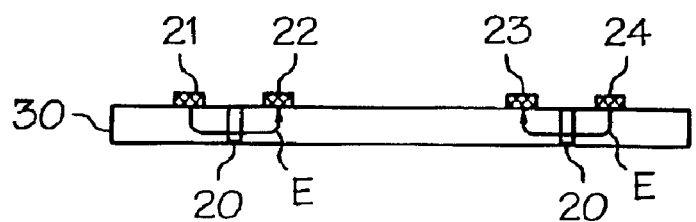
FIG. 2 is a schematic illustration, taken from a cross-sectional perspective, of a waveguide device according to one embodiment of the present invention.

The refractive index of the optically functional region 35 varies in response to a control signal applied to the optically functional region 35. The nature of the control signal depends upon the nature of the device in which the present invention is employed. In the illustrated embodiment, the control signal comprises an electrical signal in the form of an electric field E generated by control electrodes 21–24. The optically functional region 35 of the cladding 30 is responsive to the intensity and orientation of the electric field E. FIG. 2 presents a schematic illustration of a suitable electrode configuration and resulting electric field E. It is noted that a variety of electrode configurations will be suitable for generation of an electric field in the optically functional region 35 of the present invention.

In another embodiment of the present invention, the control signal may comprise an optical signal and the optically functional region 35 of the cladding 30 may be responsive to the intensity of the optical signal. Alternatively, the control signal may comprise a thermal signal and the optically functional region 35 of the cladding 30 may be responsive to the magnitude of the thermal signal. In any case, the waveguide device should further comprise a suitable controller configured to alter the optical properties of the first and second optically functional portions 32, 34 independently from each other.

According to one embodiment of the present invention, the optically functional region 35 of the cladding 30 comprises a Kerr Effect medium. Where the control signal comprises an electric field and the waveguide device is configured such that a set of control electrodes are positioned to generate the electric field in the optically functional region 35, the Kerr Effect medium may be characterized by a Kerr constant of at least about $3 \times 10^{-14}$ m/V$^2$. In many embodiments of the present invention, the Kerr Effect medium will play a stronger role in signal modulation and would be characterized by a Kerr constant of about $3 \times 10^{-12}$ m/V$^2$.

Suitable Kerr Effect mediums for use in the present invention typically comprise a polymer/chromophore blend. The polymer/chromophore blend may, for example, comprise between about 5% and about 20% chromophore, by weight, although other suitable weight % ranges are likely to also be suitable. By way of illustration and not by limitation, it is noted that the polymer may comprise a fluoropolymer or a polymer selected from polycarbonate, terpolymer, PMMA, and polycyclohexane. In the event a solvent is used to enhance chromophore mobility, suitable solvents include, but are not limited to dioxane, THS, and chloroform.

By way of illustration and not limitation, a class of suitable chromophores for use in the present invention comprises a donor component, a bridge component comprising a conjugated and/or aromatic component, and an acceptor component. The donor component may comprise a relatively strong electron donating group and the acceptor component may comprise a relatively strong electron accepting group. For the purposes of describing and defining the present invention, it is noted that a donor component comprises a component that is capable of donating electrons, an acceptor component comprises a component that is capable of accepting electrons, and a bridge component couples donor and acceptor components strongly. Preferred chromophores may also be selected by accounting for the degree to which they absorb light at the frequency of the propagating signal, with low levels of absorption preferred.

Again by way of illustration and not limitation, chromophores having the following molecular structures may be suitable for use in accordance with the present invention:

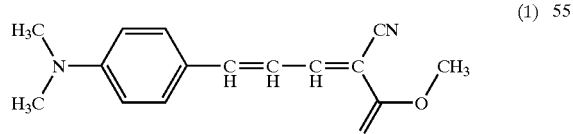
(1)

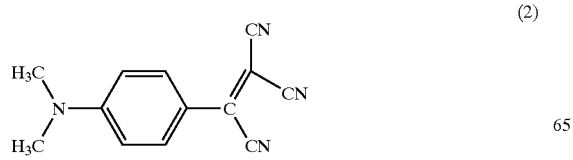
(2)

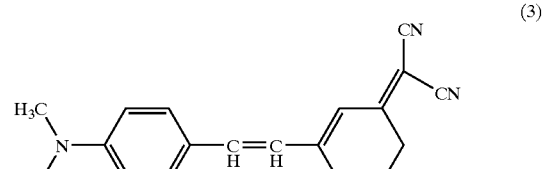
(3)

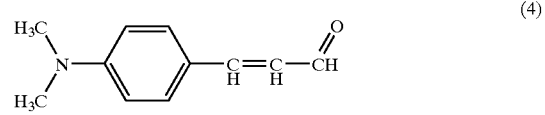
(4)

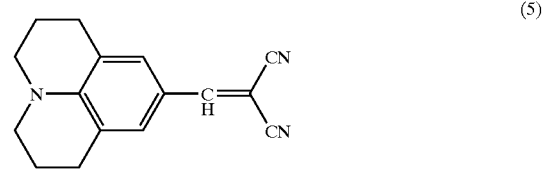
(5)

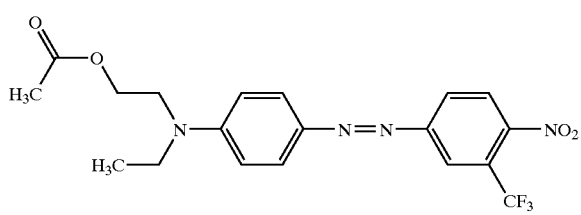
(6)

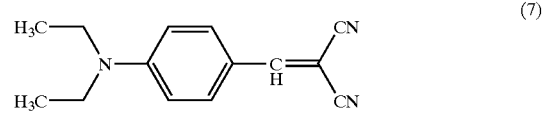
(7)

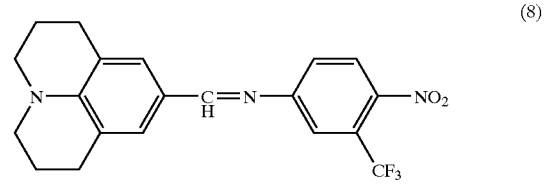
(8)

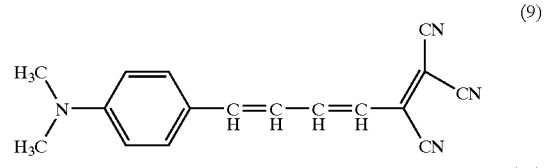
(9)

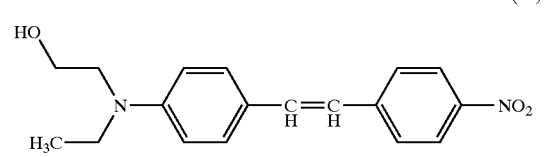
(10)

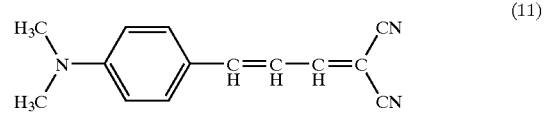
(11)

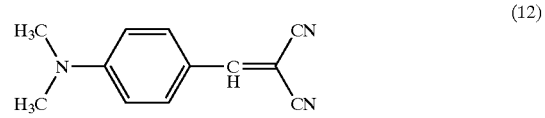
(12)

Figure 3:
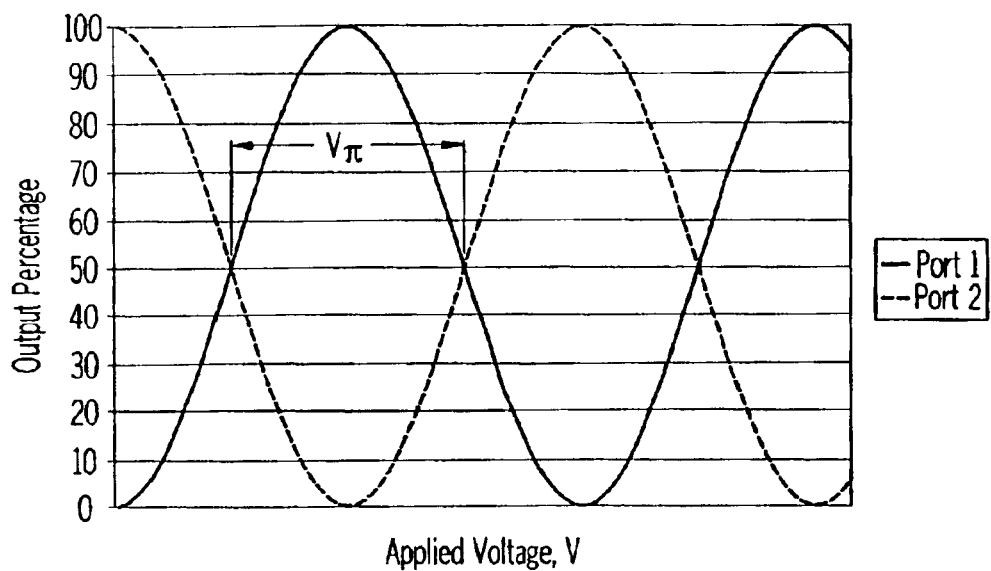
FIGS. 3–5 are graphical illustrations of the manner in which output intensity varies as a function of the magnitude of a control signal applied to a waveguide device according to the present invention.
Figure 4:
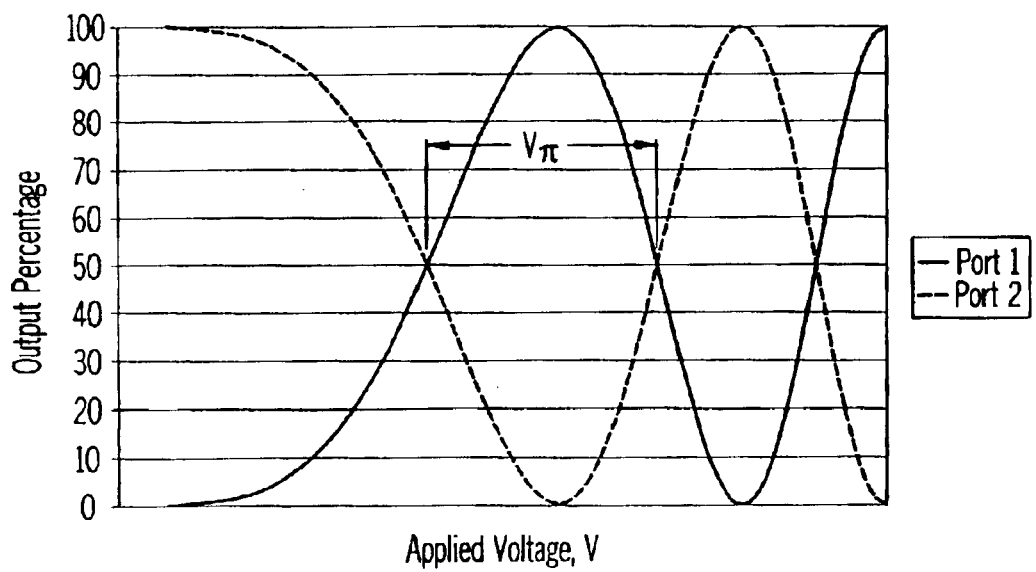

Referring now to FIGS. 3 and 4, many suitable cladding mediums according to the present invention may be characterized by the manner in which their refractive index changes in relation to the magnitude of the control signal applied thereto. FIG. 3 illustrates the manner in which the respective intensities of output signals at first and second output ports of a two-port Mach Zehnder interferometer vary as a function of the magnitude of a control signal (voltage) applied to the optically functional regions of the interferometer.

The response illustrated in FIG. 3 represents the two output channels of a Mach-Zehnder interferometer where the functional cladding responds to a voltage control signal via the Pockels Effect—an electrooptic effect in which the application of an electric field produces a birefingence that is linear in the applied field. The Pockels Effect can only occur in anisotropic mediums. For a functional polymeric cladding, this anisotropy needed form the Pockels Effect is typically introduced through electric field poling of the cladding.

In contrast, un-poled, substantially isotropic, polymer claddings are the most suitable for use in accordance with many embodiments of the present invention because they cannot exhibit the Pockels Effect, so the dominant electrooptic response results from the Kerr Effect—an electrooptic effect in which the application of an electric field produces a birefringence that varies with a square of the magnitude of the applied field or other control signal. For example, the birefringence illustrated in FIG. 4 results from use of a polymer in the optically functional region of the interferometer that defines a refractive index approximating a function that varies with a square of the control signal magnitude.

More specifically, the function approximated by the refractive index of the cladding medium of the present invention may take the form of the following equation:

$$\Delta n = \lambda K M^2$$

wherein $\Delta n$ represents a change in refractive index, $\lambda$ represents the wavelength of light propagating in the cladding, K represents a constant, and M represents the control signal magnitude. In the case of Kerr Effect cladding mediums, K would represent the Kerr constant of the Kerr Effect medium and M would represent the intensity E of the electric field applied to the medium.

Referring to FIG. 3, application of a control voltage V to the linear electrooptic polymer cladding induces a phase shift $\Delta \phi$ in the optical signal propagating through the optically functional region. The response is described herein as a "linear" response because, as is clearly illustrated in FIG. 3, successive equal phase shifts $\Delta \phi$, for example 180°, are induced by successive equal increases in control voltage V ($I \approx \sin^2 \phi$, where $\phi = AV$). Referring to FIG. 4, application of a control voltage V to an electrooptic polymer cladding according to the present invention also induces successive phase shifts $\Delta \phi$ in the optical signal but successive phase shifts of equal value are induced with progressively smaller increases in the control voltage V ($I \approx \sin^2 \phi$, where $\phi = BV^2$). Thus, in the case of successive phase shifts $\Delta \phi$ of 180°, the magnitude of the successive control voltage increments $V_\pi$ necessary for inducing the successive 180° phase shifts decreases as the magnitude of the control voltage V increases.

Figure 5:
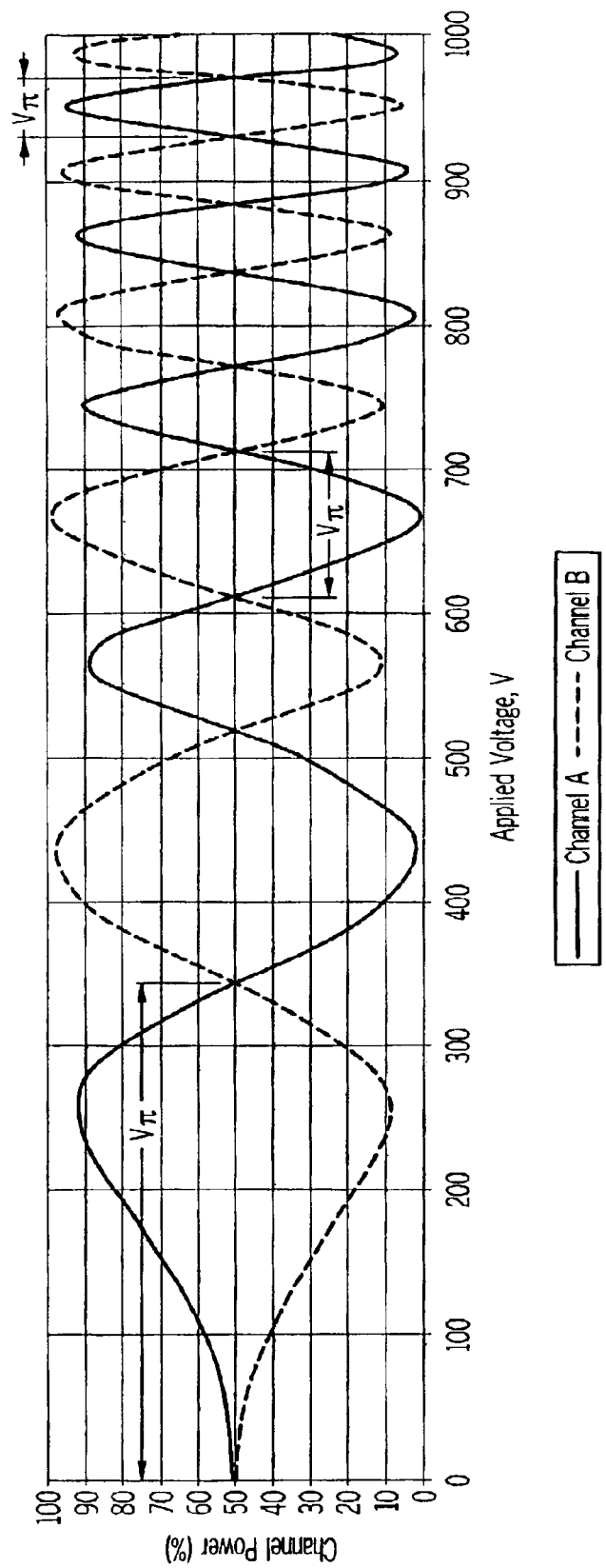

FIG. 5 presents a more detailed illustration of the decrease in the successive control voltage increments $V_\pi$ as the control voltage V increases. Specifically, the graph of FIG. 3 shows that about 340 volts are needed to drive a Mach Zehnder interferometer through a 180° phase shift. The next 180° phase shift occurs at about 520 volts but is achieved by merely increasing the drive voltage by about 180 volts (the difference between 520 volts and 340 volts). A third 180° phase shift occurs at about 610 volts, an increase of merely about 90 volts. Simple extrapolation suggests that, with a bias of about 3000 volts, a $V_\pi$ drive voltage of about 4 volts may be achieved. It is contemplated that improvements in the polymeric cladding medium and refinement of the electrode configuration employed for the control electrodes are likely to yield a device where a 180° phase shift may be achieved with drive voltages of less than 5 volts with a bias voltage of about 1000V.

Many embodiments of the present invention are likely to benefit from the use of a control signal that comprises a substantially constant bias component and a substantially variable drive component. The bias component would typically be selected to define a magnitude of the response sufficient to enable substantial control of the refractive index of the optically functional region through variation of the drive component. It is contemplated that in some applications the bias component will be at least an order of magnitude larger than the drive component. In still further applications, particularly those where a modulating output signal is desired, the bias component will comprise a DC voltage and the drive component will comprise an AC drive signal. Regardless of whether a separate bias voltage or biasing control signal is employed as a means of controlling an optically functional region according to the present invention, clear advantages are contemplated in the provision of a controller configured to provide the control signals necessary to operate waveguide devices incorporating the optically functional region. Indeed, according to one embodiment of the present invention, the controller is configured to provide an RF control signal and the optically functional region of the cladding, being characterized by a high degree of orientational mobility, transitions between a substantially oriented state and a substantially isotropic state at a frequency of said RF control signal. In this manner, the waveguide device is configured to generate an RF modulated optical output signal.

As is noted above, un-poled, substantially isotropic polymeric cladding mediums are likely to be most suitable for use in accordance with the present invention. In addition, cladding mediums according to the present invention should be able to transition passively from a substantially oriented state to a substantially isotropic state, particularly where their use in an optically functional region involves active transition to a substantially oriented state. As a result, the present invention contemplates cladding mediums comprising a polymer/chromophore blend characterized by a degree of chromophore mobility sufficient to enable the optically functional region to transition passively from a substantially oriented state to a substantially isotropic state, typically in less than about one second, and more preferably in less than one millisecond. In addition, where an un-poled, substantially isotropic, polymeric cladding medium is utilized, the degree of chromophore mobility should also be sufficient to permit transitions from a substantially isotropic state to a substantially oriented state under application of a suitable control signal.

Physical stability of the cladding medium is also likely to be a concern. As a result, it is contemplated that cladding mediums according to the present invention may be provided with acceptable degrees of chromophore mobility and physical stability by either incorporating a plasticizing agent in the cladding medium or ensuring that the effective glass transition temperature of the cladding medium is less than the operating temperature of the device. Cladding mediums characterized by effective glass transition temperatures TG below about 120° C. and even as low as 20° C. or below are contemplated by the present invention. As will be appreciated by those practicing the present invention, cladding mediums having effective glass transition temperatures $T_G$ in the vicinity of room temperature, below room temperature, or slightly above room temperature (e.g., 25° C.) eliminate many design constraints associated with maintaining a waveguide device at high temperatures (i.e., temperatures above 100° C.).

It is also contemplated that cladding mediums according to the present invention may be provided with acceptable degrees of chromophore mobility by providing a suitable solvent in the cladding medium. In the case of a polymeric cladding medium including a chromophore and a base polymer, suitable solvents will dissolve both the chromophore and the polymer. In many cases, the use of such solvents will yield suitable device operating temperatures at or near room temperature.

Temperature control may be achieved through use of a device controller that comprises a temperature controller configured to maintain the device at a predetermined operating temperature. For example, where the cladding medium is characterized by a given effective glass transition temperature $T_G$, a temperature controller may be employed to maintain the operating temperature above the effective glass transition temperature $T_G$.

Referring to the Mach Zehnder interferometer configuration illustrated in FIG. 1, although the present invention is illustrated herein with reference to optical signal splitters and combiners in the form of directional coupling regions, it is noted that the present invention contemplates utilization of any suitable conventional or suitable yet to be developed structure for optical signal splitting or combining. For example, suitable alternative structures for splitting and combining optical signals include 2×2 or 1×2 directional coupling regions, 1×2 Y signal splitters/combiners, 1×2 multimode interference element splitters/combiners, and 2×2 multimode interference element splitters/combiners. The specific design parameters of these structures are beyond the scope of the present invention and may be gleaned from existing or yet to be developed sources.

Referring further to the Mach Zehnder interferometer configuration illustrated in FIG. 1, it is noted that the optically functional regions of the first and second optical waveguide arms 12, 14 may be arranged such that, absent application of a control signal to the first and second optically functional portions 32, 34 of the arms 12, 14, the first and second optically functional portions 32, 34 define a π/2 phase difference between respective optical signals in the first and second optical waveguide arms 12, 14 at the optical signal combining region 18. In this manner, it is only necessary to induce an additional π/2 phase shift in one of the arms 12, 14 to induce a full π phase difference at the signal combining region 18. Similarly, a π/2 phase shift induced in the other arm will yield no phase difference at the signal combining region 18.

For the purposes of defining and describing the present invention, it is noted that the wavelength of "light" or an "optical signal" is not limited to any particular wavelength or portion of the electromagnetic spectrum. Rather, "light" and "optical signals," which terms are used interchangeably throughout the present specification and are not intended to cover distinct sets of subject matter, are defined herein to cover any wavelength of electromagnetic radiation capable of propagating in an optical waveguide. For example, light or optical signals in the visible and infrared portions of the electromagnetic spectrum are both capable of propagating in an optical waveguide. An optical waveguide may comprise any suitable signal propagating structure. Examples of optical waveguides include, but are not limited to, optical fibers, slab waveguides, and thin-films used, for example, in integrated optical circuits.

The refractive index of the optical waveguide core 20 is slightly higher than that of the surrounding cladding 30 at the operational temperature of the device 10. As a result, the waveguide device 10 is well suited for guiding an optical signal. According to one embodiment of the present invention, a doped silica waveguide core 20 is envisioned with a refractive index that is 0.7% higher than the cladding 30. This provides good confinement, yet allows some of the light to propagate in the cladding. If the index difference between the core and cladding is reduced to 0.35%, the optical signal will be more loosely confined and more of the light will propagate in the cladding. For a configuration with a passive waveguide core and an electrooptic cladding, more efficient electrooptic interaction will occur with the lower index difference. It is further noted that index differences between 0.3% and 1% are better suited for construction of waveguides that are not susceptible to optical losses from slight bends in the waveguide.

Figure 8:
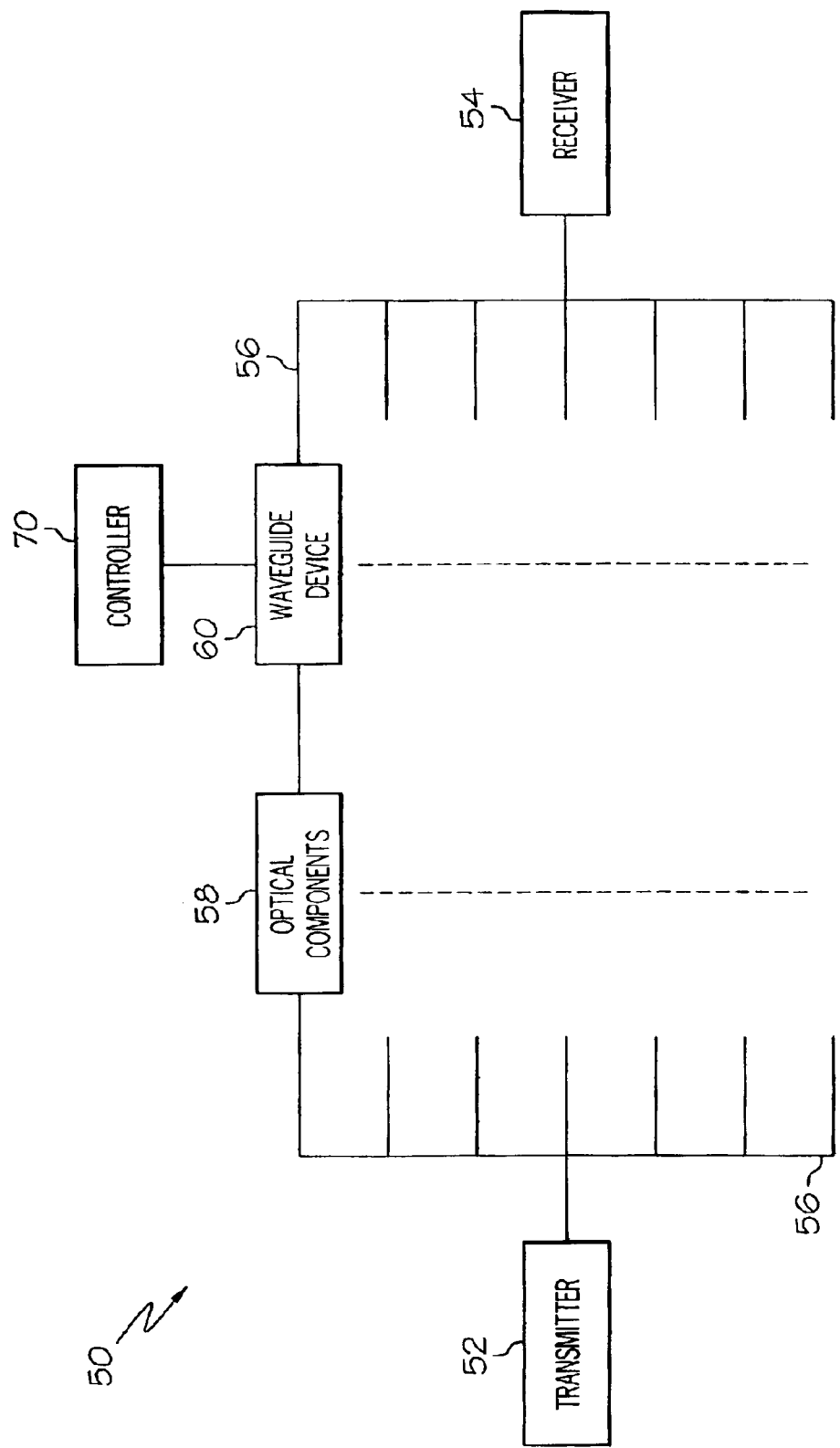
FIG. 8 illustrates an optical network including a waveguide device according to the present invention.

Referring to FIG. 8, it is noted that waveguide devices according to the present invention may be employed in a telecommunications or other type of optical network 50. An optical network 50 according to the present invention may comprise, among other things, one or more transmitters 52 and receivers 54, a network of optical transmission lines 56, a variety of optical components 58, and one or more waveguide devices 60 according to the present invention. The network 50 may further comprise electrical or other non-optical components and transmission lines (not shown). The optical transmitters 52 are configured to transmit optical signals. The variety of optical components commonly utilized in an optical network are illustrated herein with reference to a single block element to preserve clarity of illustration and may include, for example, optical switches, amplifiers, couplers, regenerators, filters, etc.

A controller 70 is provided to enable operation of the waveguide devices 60 on a fully automated basis or in response to an operator command. The controller 70 is configured to establish and control the control signal applied to the optically functional region of each waveguide device 60. The controller may also be utilized to help control the operating temperature or any other operating parameter of the waveguide devices or optical network 50.

Several embodiments of the present invention described herein are directed to affecting refractive index using functional electrooptic claddings. However, it is contemplated that many of the embodiments described herein are also applicable for functional electrooptic waveguide cores—with or without functional claddings.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A waveguide device comprising an optical waveguide core, a cladding optically coupled to said optical waveguide core, and a controller wherein:

said cladding comprises an optically functional region;

said controller is configured apply a control signal to said optically functional region;

said control signal is of sufficient magnitude to enable the optically functional region of said cladding to transition from a substantially isotropic state to a substantially oriented state under application of said control signal;

said optically functional region of said cladding defines a refractive index that is configured to vary in response to variation of said control signal; and said variation of said refractive index of said cladding under application of said control signal is dominated by an electrooptic response resulting from the Ken Effect.

2. A waveguide device as claimed in claim 1 wherein:

said electrooptic response resulting from said Kerr Effect is characterized by a phase shift $\Delta\phi$ induced in an optical signal propagating through said optically functional region in response to said control signal;

successive phase shifts $\Delta\phi$ of 180° are induced in said optical signal as a magnitude of said control signal is increased in successive increments; and said successive increments decrease in magnitude as said magnitude of said control signal is increased.

3. A waveguide device as claimed in claim 1 wherein:

said optically functional region of said cladding comprises a cladding medium configured to induce a phase shift $\Delta\phi$ in an optical signal propagating through said optically functional region in response to a control voltage V applied to said optically functional region; and said cladding medium is configured such that successive phase shifts $\Delta\phi$ of 180° are induced in said optical signal as a magnitude of said control voltage is increased in successive increments $V_\pi$ and such that said successive increments $V_\pi$ decrease in magnitude as said magnitude of said control voltage is increased.

4. A waveguide device as claimed in claim 3 wherein said successive increments $V_\pi$ decrease according to a quadratic relationship with said control signal.

5. A waveguide device as claimed in claim 1 wherein said cladding comprises an optically functional region defined by an un-poled, substantially isotropic, polymeric cladding medium.

6. A waveguide device as claimed in claim 1 wherein said cladding medium comprises a polymer/chromophore blend characterized by a degree of chromophore mobility sufficient to enable said optically functional region to transition passively from a substantially oriented state to a substantially isotropic stale in less than about one second.

7. A waveguide device as claimed in claim 6 wherein said predetermined degree of chromophore mobility is sufficient to enable said optically functional region to transition passively from said substantially oriented state to said substantially isotropic state in less than about 1 ms.

8. A waveguide device as claimed in claim 6 wherein said optically functional region is operative over a predetermined temperature range and wherein said predetermined degree of chromophore mobility is sufficient to enable said passive transition within said temperature range.

9. A waveguide device as claimed in claim 8 wherein said temperature range extends from about 0° C. to about 100° C.

10. A waveguide device as claimed in claim 8 wherein said temperature range is less than about 100° C.

11. A waveguide device as claimed in claim 1 wherein:

said waveguide device further comprises a controller configured to control an operating temperature of said waveguide device;

said polymeric cladding medium is characterized by an effective glass transition temperature that is less than an operating temperature of said device.

12. A waveguide device as claimed in claim 11 wherein said operating temperature of said device is less than about 100° C.

13. A waveguide device as claimed in claim 11 wherein said operating temperature of said device is about 25° C.

14. A waveguide device as claimed in claim 1 wherein said waveguide device further comprises a controller configured to provide said control signal.

15. A waveguide device as claimed in claim 14 wherein said control signal comprises a bias component and a drive component.

16. A waveguide device as claimed in claim 15 wherein said bias component is substantially constant relative to said drive component and said drive component is substantially variable relative to said bias component.

17. A waveguide device as claimed in claim 15 wherein said bias component defines a magnitude sufficient to enable substantial control of said refractive index of said optically functional region through variation of said drive component.

18. A waveguide device as claimed in claim 15 wherein said bias component is at least an order of magnitude larger than said drive component.

19. A waveguide device as claimed in claim 15 wherein said bias component comprises a DC voltage and said drive component comprises an AC drive signal.

20. A waveguide device as claimed in claim 1 wherein said optically functional region of said cladding comprises a polymer/chromophore blend.

21. A waveguide device as claimed in claim 20 wherein said polymer/chromophore blend comprises between about 5% and about 20% chromophore, by weight.

22. A waveguide device as claimed in claim 20 wherein said polymer comprises a fluoropolymer.

23. A waveguide device as claimed in claim 20 wherein said polymer/chromophore blend comprises a polymer selected from polycarbonate, terpolymer, PMMA, and polycyclohexane.

24. A waveguide device as claimed in claim 20 wherein said polymer/chromophore blend is plasticized.

25. A waveguide device as claimed in claim 20 wherein said chromophore comprises a donor component, a bridge component comprising a conjugated and/or aromatic component, and an acceptor component.

26. A waveguide device as claimed in claim 20 wherein said donor component comprises a relatively strong election donating group.

27. A waveguide device as claimed in claim 20 wherein said acceptor component comprises a relatively strong electron accepting group.

28. A waveguide device as claimed in claim 20 wherein said chromophore is characterized by the following molecular structure:

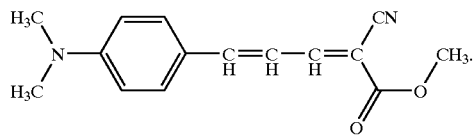

29. A waveguide device as claimed in claim 20 wherein said chromophore is characterized by the following molecular structure:

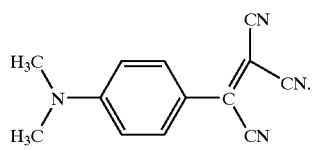

30. A waveguide device as claimed in claim 20 wherein said chromophore is characterized by the following molecular structure:

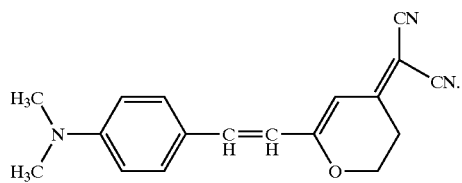

31. A waveguide device as claimed in claim 20 wherein said chromophore is characterized by the following molecular structure:

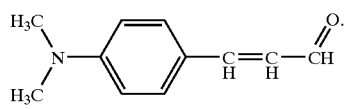

32. A waveguide device as claimed in claim 20 wherein said chromophore is characterized by the following molecular structure:

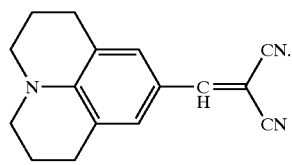

33. A waveguide device as claimed in claim 20 wherein said chromophore is characterized by the following molecular structure:

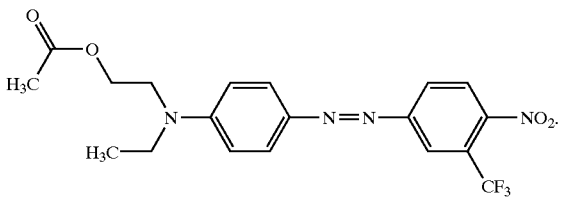

34. A waveguide device as claimed in claim 20 wherein said chromophore is characterized by the following molecular structure:

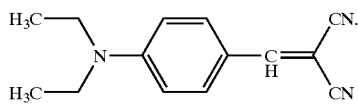

35. A waveguide device as claimed in claim 20 wherein said chromophore is characterized by the following molecular structure:

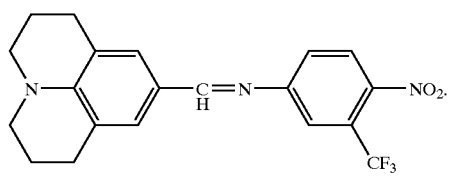

36. A waveguide device as claimed in claim 20 wherein said chromophore is characterized by the following molecular structure:

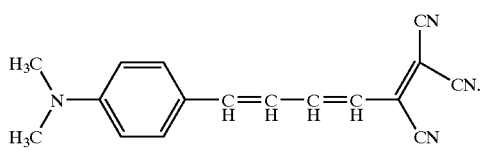

37. A waveguide device as claimed in claim 20 wherein said chromophore is characterized by the following molecular structure:

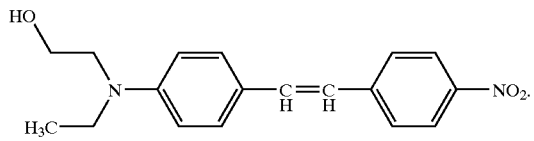

38. A waveguide device as claimed in claim 20 wherein said chromophore is characterized by the following molecular structure:

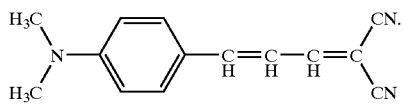

39. A waveguide device as claimed in claim 20 wherein said chromophore is characterized by the following molecular structure:

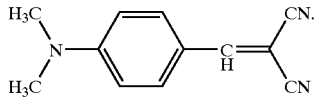

40. A waveguide device as claimed in claim 20 wherein said polymer/chromophore blend comprises a solvent configured to enhance a mobility of a chromophore component within said polymer/chromophore blend.

41. A waveguide device as claimed in claim 1 wherein:
said waveguide device further comprises a temperature controller configured to maintain said device at a predetermined operating temperature; and
said optically functional region of said cladding is characterized by an effective glass transition temperature below said predetermined operating temperature.

42. A waveguide device as claimed in claim 1 wherein said optically functional region of said cladding is characterized by an effective glass transition temperature below about 120° C.

43. A waveguide device as claimed in claim 1 wherein said optically functional region of said cladding is characterized by an effective glass transition temperature below about 20° C.

44. A waveguide device as claimed in claim 1 wherein said refractive index of said optically functional region of said cladding is lower than said refractive index of said optical waveguide core at a temperature above an effective glass transition temperature of said optically functional region of said cladding.

45. A waveguide device as claimed in claim 1 wherein said refractive index of said optically functional region of said cladding is lower than said refractive index of said optical waveguide core at wavelengths between about 1200 nm and about 1650 nm.

46. A waveguide device as claimed in claim 1 wherein said refractive index of said optically functional region of said cladding is lower than said refractive index of said optical waveguide core at a wavelength of about 1300 nm or about 1550 nm.

47. A waveguide device as claimed in claim 1 wherein said respective refractive indices of said optically functional region of said cladding and said optical waveguide core are such that a substantial portion of light introduced into said waveguide core along an optical axis of said device is confined within said waveguide core while a substantial portion of said light introduced into said waveguide core is allowed to propagate in said optically functional region of said cladding.

48. A waveguide device as claimed in claim 47 wherein at least about 10% of said light introduced into said waveguide core is confined within said waveguide core.

49. A waveguide device as claimed in claim 47 wherein at least about 10% of said light introduced into said waveguide core is allowed to propagate in said optically functional region of said cladding.

50. A waveguide device as claimed in claim 47 wherein between about 30% and about 90% of said light introduced into said waveguide core is confined within said waveguide core.

51. A waveguide device as claimed in claim 47 wherein between about 40% and about 60% of said light introduced into said waveguide core is confined within said waveguide core.

52. A waveguide device as claimed in claim 1 wherein said refractive index of said optically functional region is between about 0.3% and about 1% lower than said refractive index of said optical waveguide core.

53. A waveguide device as claimed in claim 1 wherein said refractive index of said optical waveguide core is between about 1.45 and about 1.46.

54. A waveguide device as claimed in claim 53 wherein said refractive index of said optically functional region of said cladding is between about 1.44 and about 1.45.

55. A waveguide device as claimed in claim 1 wherein said refractive index of said optical waveguide core is about 1.45.

56. A waveguide device as claimed in claim 55 wherein said refractive index of said optically functional region of said cladding is between about 0.3% and about 1% lower than said refractive index of said optical waveguide core.

57. A waveguide device as claimed in claim 55 wherein said refractive index of said optically functional region of said cladding i about 1.44.

58. A waveguide device as claimed in claim 1 wherein said refractive index of said optical waveguide core is about 1.454.

59. A waveguide device as claimed in claim 58 wherein said refractive index of said optically functional region of said cladding is about 1.444.

60. A waveguide device as claimed in claim 1 wherein said optical waveguide core defines a cross sectional width of between about 3 $\mu$m and about 10 $\mu$m.

61. A waveguide device as claimed in claim 1 wherein said optical waveguide core defines a cross sectional height of between about 5 $\mu$m and about 7 $\mu$m.

62. A waveguide device as claimed in claim 1 wherein said optical waveguide core comprises an optically passive material.

63. A waveguide device as claimed in claim 62 wherein said optically passive portion of said optical waveguide core and said optically functional region of said cladding lie along a common portion of an optical axis of said waveguide device.

64. A waveguide device as claimed in claim 1 wherein said optical waveguide core comprises an optically functional portion.

65. A waveguide device as claimed in claim 64 wherein said optically functional portion of said optical waveguide core and said optically functional region of said cladding lie along a common portion of an optical axis of said waveguide device.

66. A waveguide device as claimed in claim 1 wherein said control signal comprises an optical signal and wherein said optically functional region of said cladding is responsive to an intensity of said optical signal.

67. A waveguide device as claimed in claim 1 wherein said control signal comprises an electrical signal and wherein said optically functional region of said cladding is responsive to an magnitude of said electrical signal.

68. A waveguide device as claimed in claim 1 wherein said control signal comprises a thermal signal and wherein said optically functional region of said cladding is responsive to an magnitude of said thermal signal.

69. A waveguide device as claimed in claim 1 wherein said waveguide device further comprises a set of control electrodes positioned to generate an electric field in said optically functional region, and wherein said control signal comprises said electric field.

70. A waveguide device as claimed in claim 69 wherein said optically functional region of said cladding is characterized by a Kerr constant of at least about $3\times10^{-12}$ m/V$^2$.

71. A waveguide device as claimed in claim 69 wherein said optically functional region of said cladding is characterized by a Kerr constant of about $3\times10^{-12}$ m/V$^2$.

72. A waveguide device as claimed in claim 1 wherein:
said waveguide device comprises first and second optical waveguide arms arranged to define an optical signal splitting region near an input side of said waveguide device and an optical signal combining region near an output side of said waveguide device;
said optically functional region is disposed between said optical signal splitting and combining regions; and
said optically functional region comprises a first optically functional portion associated with said first optical waveguide arm and a second optically functional portion associated with said second optical waveguide arm.

73. A waveguide device as claimed in claim 72 wherein said optical signal splitting region and said optical signal combining regions comprise optical structure selected from 2×2 or 1×2 directional coupling regions, 1×2 Y signal splitters/combiners, 1×2 multimode interference element splitters/combiners, and 2×2 multimode interference element splitters/combiners.

74. A waveguide device as claimed in claim 1 wherein said controller is configured to alter optical properties of said first and second optically functional portions independently from each other.

75. A waveguide device as claimed in claim 74 wherein:
absent application of a control signal from said controller to said first and second optically functional portions, said first and second optically functional portions define a π/2 phase difference between respective optical signals in said first and second optical waveguide arms at said optical signal combining region; and
said controller is configured to generate an additional π/2 phase shift in either of said first and second optically functional portions of first and second optical waveguide arms.

76. A waveguide device as claimed in claim 1 wherein:
said optically functional region of said cladding comprises a cladding medium defining a refractive index approximating a function that varies with a square of said control signal magnitude.

77. A waveguide device as claimed in claim 76 wherein said function approximated by said refractive index of said cladding medium comprises:

$$\Delta n = \lambda K M^2$$

wherein Δn represents a change in refractive index, λ represents the wavelength of light propagating in said cladding, K represents a constant, and M represents said control signal magnitude.

78. A waveguide device as claimed in claim 77 wherein said cladding medium comprises a Kerr Effect medium and K represents the Kerr constant of said Kerr Effect medium.

79. A waveguide device as claimed in claim 77 wherein said control signal comprises an electric field and M represents an intensity E of said electric field.

80. An optical network comprising at least one transmitter, at least one receiver, a network of transmission lines interconnecting said transmitter and said receiver, and at least one waveguide device, said waveguide device comprising an optical waveguide core, a cladding optically coupled to said optical waveguide core, and a controller, wherein:
said cladding comprises an optically functional region;
said controller is configured apply a control signal to said optically functional region;
said control signal is of sufficient magnitude to enable the optically functional region to transition from a substantially isotropic state to a substantially oriented state under application of said control signal;
said optically functional region defines a refractive index that is configured to vary in response to variation of said control signal; and
said variation of said refractive index under application of said control signal is dominated by an electrooptic response resulting from the Kerr Effect.

81. A waveguide device comprising an optical waveguide core, a cladding optically coupled to said optical waveguide core, and an RF modulation controller configured to provide an RF modulating control signal to an optically functional region of said cladding wherein:
said optically functional region is defined by a polymeric cladding medium comprising a polymer/chromophore blend;
said RF modulating control signal is of sufficient magnitude to enable the optically functional region to transition from a substantially isotropic state to a substantially oriented state under application of said control signal;
said polymeric cladding medium of said optically functional region defines a refractive index that is configured to vary in response to said RF modulating control signal applied to said optically functional region;
said variation of said refractive index under application of said RF modulating control signal is dominated by an electrooptic response resulting from the Kerr Effect;
said polymeric cladding medium is characterized by a predetermined degree of chromophore mobility;
said predetermined degree of chromophore mobility is sufficient to enable transition of said optically functional region between a substantially oriented slate and a substantially isotropic state at a frequency of said RF control signal.

* * * * *

UNITED STATES PATENT AND TRADEMARK OFFICE
CERTIFICATE OF CORRECTION

PATENT NO. : 6,931,164 B2  
APPLICATION NO. : 10/395835  
DATED : August 16, 2005  
INVENTOR(S) : Risser et al.

It is certified that error appears in the above-identified patent and that said Letters Patent is hereby corrected as shown below:

Column 11, Line 30 "Ken" should read --Kerr--;

Column 11, Line 66 "stale" should read --state--;

Column 12, Line 12 "C." should read --C--;

Column 13, Line 2 "election" should read --electron--;

Column 16, Line 20 "i" should read --is--;

Column 16, Line 68 "3x10-12" should read --3x10-14--;

Column 18, Line 28 "cladding" should read --cladding,--; and

Column 18, Line 48 "slate" should read --state--.

Signed and Sealed this

First Day of August, 2006

JON W. DUDAS  
*Director of the United States Patent and Trademark Office*